US012659019B2

(12) United States Patent
Arnaud et al.

(10) Patent No.: US 12,659,019 B2
(45) Date of Patent: Jun. 16, 2026

(54) COMMUNICATION DEVICE FOR A 5G COMMUNICATION BETWEEN A MOBILE TERMINAL AND A CORE NETWORK VIA A SATELLITE

(71) Applicant: THALES, Courbevoie (FR)

(72) Inventors: Mathieu Arnaud, Toulouse (FR); Benjamin Baudry, Toulouse (FR)

(73) Assignee: THALES, Courbevoie (FR)

( * ) Notice: Subject to any disclaimer, the term of this patent is extended or adjusted under 35 U.S.C. 154(b) by 368 days.

(21) Appl. No.: 18/076,307

(22) Filed: Dec. 6, 2022

(65) Prior Publication Data

US 2023/0188202 A1 Jun. 15, 2023

(30) Foreign Application Priority Data

Dec. 9, 2021 (FR) ...................................... 2113205

(51) Int. Cl.
*H04B 7/185* (2006.01)
*H04W 56/00* (2009.01)

(52) U.S. Cl.
CPC ..... *H04B 7/18519* (2013.01); *H04B 7/18513* (2013.01); *H04W 56/0045* (2013.01)

(58) Field of Classification Search
CPC ............ H04B 7/18519; H04B 7/18513; H04B 7/18515; H04W 56/0045; H04W 56/004
USPC ....................................................... 370/316
See application file for complete search history.

(56) References Cited

U.S. PATENT DOCUMENTS

| | | | | |
|---|---|---|---|---|
| 2012/0051284 A1* | 3/2012 | Chang | .................. | H04B 7/1851 |
| | | | | 370/316 |
| 2017/0339616 A1* | 11/2017 | Baudoin | .............. | H04B 7/1851 |
| 2021/0314061 A1* | 10/2021 | Breynaert | ......... | H04B 7/18513 |
| 2021/0314889 A1* | 10/2021 | Rico Alvarino | .. | H04W 56/0005 |
| 2021/0384964 A1* | 12/2021 | Ravishankar | ...... | H04B 7/18513 |
| 2022/0086780 A1* | 3/2022 | Tsai | ........................ | G01S 19/05 |
| 2022/0200695 A1* | 6/2022 | Ren | ..................... | H04W 56/004 |
| 2022/0393957 A1* | 12/2022 | Wang | ................ | H04W 56/0045 |
| 2024/0163826 A1* | 5/2024 | Medles | ................ | H04B 7/1851 |
| 2024/0267865 A1* | 8/2024 | Ma | .................... | H04W 56/0045 |

OTHER PUBLICATIONS

"Discussion on UL time and frequency synchronization enhancement for NTN", 3GPP TSG RAN WGI Meeting #104bis-e, R1-2102342, 2021.
"FL Summary on enhancements on UL time and frequency synchronization for NR NTN", 3GPP TSG-RAN WGI Meeting #105-e, R1-2104303, 2021.
"Discussion on timing relationship enhancement in Ntn", 3GPP TSG RAN WGI Meeting #104-bis-e, R1-2103671, 2021.

* cited by examiner

*Primary Examiner* — Ayman A Abaza
*Assistant Examiner* — Tracy L Williams
(74) *Attorney, Agent, or Firm* — BakerHostetler

(57) ABSTRACT

A 5G communication system between at least one mobile terminal and a core network, the communication system includes at least one satellite, an access network comprising a plurality of base stations and a gateway disposed between the satellite and one of the base stations, the satellite and the gateway being able to exchange service frames comprising uplink service frames and downlink service frames, the uplink service frames having to be temporally aligned with the downlink service frames around a time reference point.

6 Claims, 8 Drawing Sheets

Time
reference
point Uu

COMMUNICATION DEVICE FOR A 5G COMMUNICATION BETWEEN A MOBILE TERMINAL AND A CORE NETWORK VIA A SATELLITE

CROSS-REFERENCE TO RELATED APPLICATION

This application claims priority to foreign French patent application No. FR 2113205, filed on Dec. 9, 2021, the disclosure of which is incorporated by reference in its entirety.

FIELD OF THE INVENTION

The present invention relates to the implementation of 5G communications on a mobile terminal via a satellite of a constellation of satellites.

BACKGROUND

The satellite systems for mobile terminals are, these days, proprietary with little or no interoperability either between the different satellite systems or with the terrestrial mobile networks. The existing mobile terminals and network equipment are expensive and specific. That limits them to niche markets and does not allow them to create a solution for the wide consumer market.

The standardization organization for 3GPP ("3rd Generation Partnership Project") mobile networks seeks to address this problem by proposing modifications to the 5G standard, called fifth generation mobile network, to make it compatible from a satellite point of view. Modifications then need to be provided on all the components of the system. For that, a new version of the 3GPP standard is currently being prepared in version No. 17 to allow the use of 5G by satellite in the context of a 3GPP NTN ("Non-Terrestrial Networks") work group. This version provides modifications at the level of the various components of the communication system. It is known that a communication system for a 5G communication comprises a so-called Core Network and at least one base station. In a satellite system, the communication system also comprises at least one gateway disposed between the base station and the satellite. The communication system thus allows a 5G communication between mobile terminals and the core network.

Even though modifications to the 3GPP standard will be made, the mobile terminals, the core network and the base station are not designed and developed for propagation channels of satellite type or to manage dynamic modifications in the topology of a network resulting from a constellation of non-geostationary satellites.

There is therefore a need to propose a solution that makes it possible to minimize the impacts of the support for 5G access by satellite on the base station and the mobile terminal in order to reuse standard equipment.

SUMMARY OF THE INVENTION

The present invention aims to at least partly remedy this need.

More particularly, the objective of the present invention is to promote the adoption of satellite access by the cellular 3GPP ecosystem.

For that, a first subject of the invention relates to a communication system for a 5G communication between at least one mobile terminal and a core network, said communication system comprising at least one satellite, a base station linked to the core network and a gateway disposed between said satellite and said base station. The satellite and the gateway are able to exchange feeder link frames. The terminal and the satellite are able to exchange data frames called service frames. The service frames comprise uplink service frames and downlink service frames, said uplink service frames having to be temporally aligned with said downlink service frames around a time reference point. The satellite comprises a payload comprising a radio unit suitable for managing the exchanges of service frames between said satellite and said mobile terminal. The communication system comprises a compensation device suitable for compensating time differences in the exchange of the feeder link frames in order to temporally align the uplink service frame and the downlink service frames around the time reference point. The compensation device comprises a buffer module disposed in the payload of the satellite, said buffer module being able to receive the feeder link frames. The compensation device comprises a pre-compensation module in the gateway and in which the buffer module is able to temporally resynchronize the feeder link frames with respect to a reference clock of the satellite.

As is known, the base station of a 5G communication system is composed of a so-called Central Unit, a so-called Distributed Unit for the baseband and a so-called Radio Unit. The invention here proposes that radio unit be borne by a payload of the satellite, while making it possible to retain on the ground the main functionalities of the base station, the central unit and the distributed unit, in order to optimize the overall cost of the system. In order to manage the delays that are significant (several milliseconds at least for low orbits of LEO type and significantly more for orbits of MEO type) and variables between the radio unit and the baseband on the ground resulting from the integration of the radio unit in the satellite, a compensation mechanism is provided to compensate the time delays in the exchange of the feeder link frames. This mechanism allows a masking of said time differences with respect to the mobile terminal, which then does not need to directly compensate these differences. The invention also makes it possible to shift the 5G interface time reference point to any point of the system. In the 3GPP 5G standard, the 5G interface reference point is a point where the uplink service frames are temporally aligned with the downlink service frames in a frequency duplex division (called "FDD") system. Furthermore, the alignment of the frames in the uplink direction between the different terminals of a 5G cell is necessary to avoid interferences between them. In the 3GPP standard, so as to respect the alignment at the 5G interface time reference point, the mobile terminal must apply an anticipation (called "Timing advance") to the transmission in the uplink direction. This timing advance is driven and corrected by the base station, as a function of the drift measured by said base station on the reception of frames, so as to compensate a so-called Round-Trip Delay between the mobile terminal and the 5G interface time reference point. In a terrestrial 5G system, the reference point is situated at an antenna of the base station and therefore very close to the baseband, which makes it possible to disregard the propagation delay between the two. In such a terrestrial 5G system, having a reference point other than at the base station (on the ground) would require this base station to dynamically take account of the delay between this reference point and the base station at the time of scheduling of the frames. This scheduling typically has to be done every millisecond. In a satellite system, it is therefore necessary at the same time to know the delay on the connection link between the gateway and the satellite (called "feeder" link), based on the knowledge of the current position of the satellite and of the base station or else by performing a measurement of the transfer delay over the link, while being capable of adapting the scheduling as a function of the real delay, which can be complex to implement. Through the compensation mechanism, the invention makes it possible to shift the 5G interface reference point away from the base station while making the management of such a shift of reference point less complex.

The invention also proposes implementing a bufferization, in the satellite, of the feeder link frames received from the gateway before transmission to the mobile terminal, in order to absorb the variation of delay on the feeder link between the satellite and the base station on the ground.

Furthermore, it is possible to save on the memory needed in the satellite to implement the bufferization. A more economical implementation consists then in doing a first bufferization at the gateway to compensate most of the delay on the feeder link, the satellite then being simply responsible for the fine synchronization of the service frames with the reference time before transmission to the mobile terminal.

In a particular embodiment, the payload is partially regenerative.

This regenerative architecture presents several advantages by greatly reducing the bandwidth needed on the feeder link to have the traffic pass between the satellite and the gateway.

In a particular embodiment, the reference point is disposed in the satellite.

In a particular embodiment, the mobile terminal belonging to a 5G cell, the time reference point is disposed in said 5G cell.

In a particular embodiment, the radio unit comprises a radiofrequency (RF) module and/or an L1 or L1-low module.

The satellite then carries a part of the 5G functionalities on board, that is to say the 5G RF which generates the service frames and the L1-low module which corresponds to the bottom part of the physical layer in an eCPRI (enhanced Common Public Radio Interface) functional subdivision of "split 7 or its derivatives "split 7-2/7-2x/7-3" type or else an L1 module which corresponds to all of the physical layer in an eCPRI functional subdivision of "split 6" type.

Another subject of the invention relates to a communication method for a 5G communication between at least one mobile terminal and a core network, said communication method comprising:

exchanges of feeder link frames between said satellite and a gateway, said gateway being disposed between said satellite and a base station linked to the core network;

exchanges of data frames, called service frames, between said mobile terminal and a satellite, said service frames comprising uplink service frames and downlink service frames, said uplink service frames having to be temporally aligned with said downlink service frames around a time reference point, said service frames being managed by a radio unit belonging to a payload of the satellite;

a compensation step suitable for compensating time differences in the exchange of the feeder link frames in order to temporally align the uplink service frames and the downlink service frames around the time reference point. The compensation step comprises two substeps performed respectively in the payload of the satellite and in the gateway.

BRIEF DESCRIPTION OF THE DRAWINGS

The present invention will be better understood on reading the detailed description of embodiments given as non-limiting examples and illustrated by the attached drawings in which.

DETAILED DESCRIPTION

The invention is not limited to the embodiments and variants presented and other embodiments and variants will become clearly apparent to the person skilled in the art.

Figure 1:
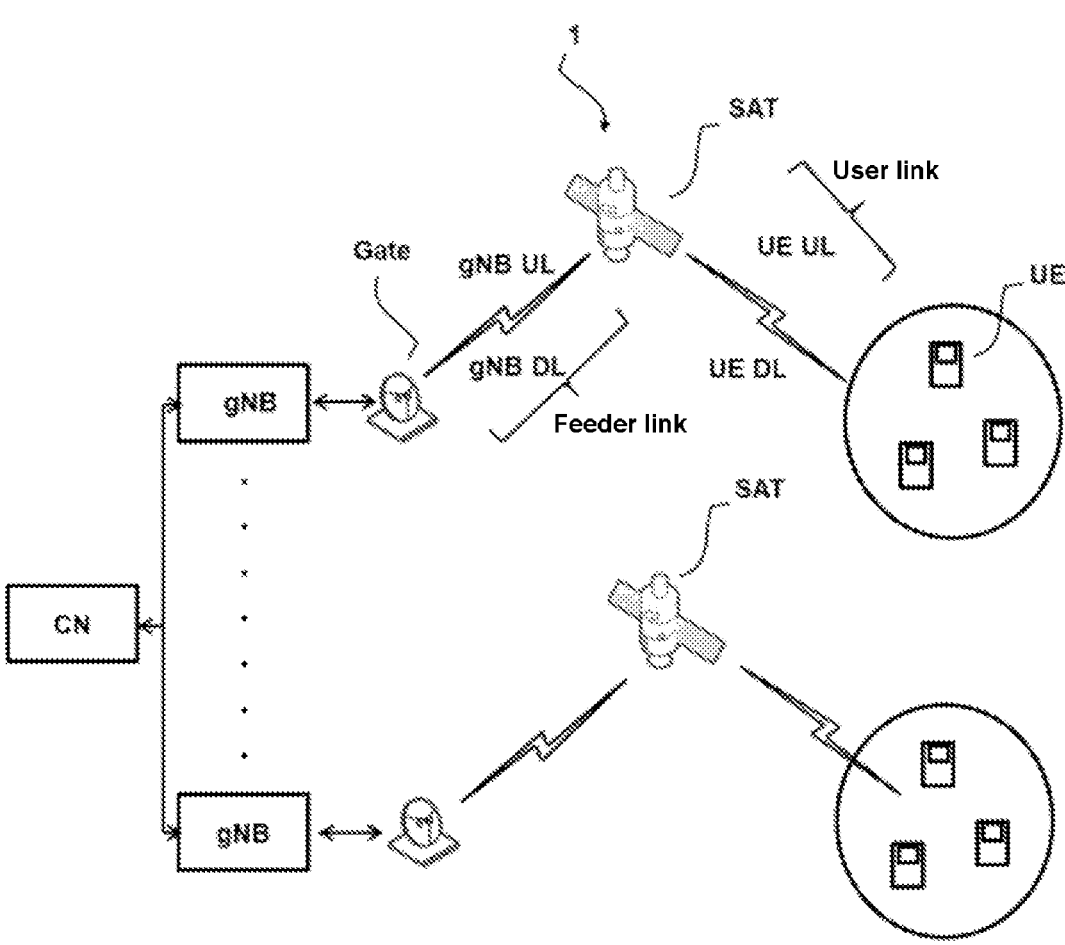
FIG. 1 illustrates a communication system according to the invention for a 5G communication between at least one mobile terminal and a core network via a satellite.

FIG. 1 illustrates a communication system 1 for a 5G communication between a core network CN and a mobile terminal UE. The core network CN allows an interconnection with different service providers. It comprises a plurality of routers and of switches which make it possible to provide aggregation, authentication, monitoring, billing, service invocation and/or gateway functions. The mobile terminal UE is adapted to receive and exchange service frames, more particularly, these service frames can be uplink service frames UE UL transmitted by the mobile telephone UE or downlink service frames UE DL received by this mobile telephone UE. The uplink service frames UE UL are temporally aligned with the downlink service frames UE DL around a time reference point $R_P$.

The communication system 1 comprises:

at least one satellite SAT;

a plurality of gateways Gate;

a plurality of base stations gNB.

The satellite SAT is adapted to transmit downlink service frames UE DL to the mobile telephone UE. The satellite SAT is also adapted to receive uplink service frames UE UL transmitted by the mobile equipment UE. The uplink service frames UE UL and the downlink service frames UE DL use, for example, a frequency band ranging from 2 GHz to 4 GHz (S band). As a variant, the uplink service frames UE UL and the downlink service frames UE DL use the frequencies of the C band. Other frequency bands can also be used, such as the L band (1.5-1.7 GHz), or the MS (cellular-terrestrial) bands. The satellite SAT is also adapted to manage feeder link frames exchanged with the base stations gNB. These feeder link frames comprise uplink feeder link frames gNB UL transmitted by the base stations gNB to the satellite SAT and downlink feeder link frames gNB DL transmitted by the satellite SAT to the base stations gNB. The feeder link frames use the Ka band via a protocol of eCPRI/ORAN ("Open Radio Access Network") type. As a variant, the feeder link frames use the QN bands or the C band. The satellite SAT is thus at the interface between the feeder link frames and the service frames which allows data to be conveyed by feeder link frames between the base stations gNB and the satellite SAT and then by service frames between the satellite SAT and the mobile telephone UE. The satellite SAT is, for example, a satellite moving on a non-geostationary orbit, called NGSO ("Non-Geostationary Orbit") satellite, such as an LEO ("Low-Earth Orbit"), vLEO ("very Low-Earth Orbit") or MEO ("Medium-Earth Orbit") satellite. The reference point of this satellite moves with respect to the base stations gNB and this delay is greatly variable, for example it can be between 2 and 5 ms with a rate of variation of up to 25 ppm in the case where the satellite is on an orbit at 600 km.

The base stations gNB are adapted to transmit uplink feeder link frames gNB UL and to receive downlink feeder link frames gNB DL. Each base station gNB is composed of a so-called "Central Unit" CU, of a so-called "Distributed Unit" DU for a baseband and of a so-called "Radio Unit" RU The gateways Gate are disposed between the base stations gNB and the satellite SAT. They allow a communication between the wired environment of the base stations gNB and the radio environment associated with the satellite SAT to be made possible.

Figure 2:
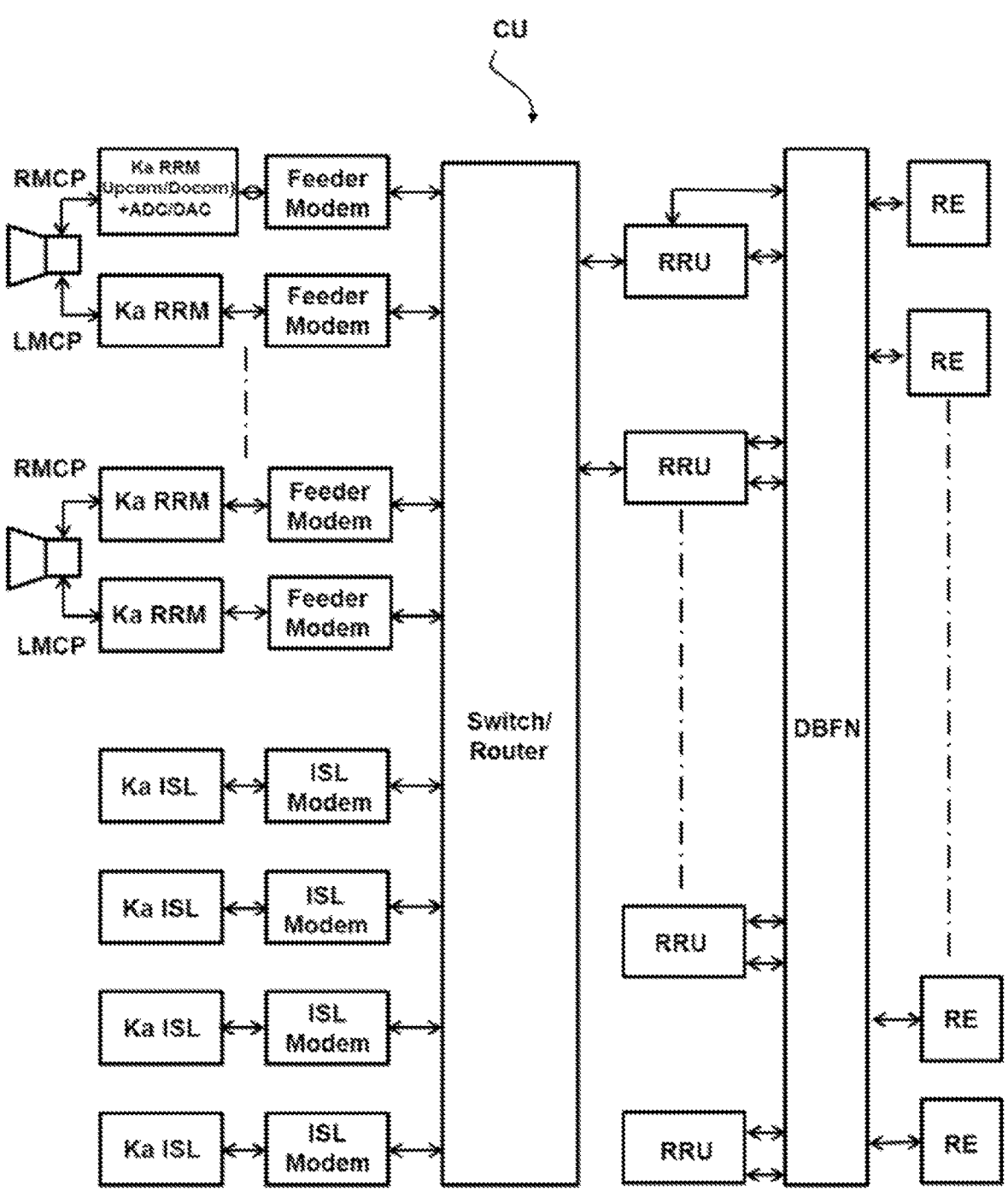
FIG. 2 illustrates operation of a payload in the satellite of FIG. 1.

FIG. 2 illustrates operation of a payload CU in an LEO satellite of FIG. 1. The architecture of the payload comprises the radio unit functionality (RRU) on board the satellite SAT. The payload CU is connected to a beam-forming distributed digital network for the downlink service frames UE DL to the mobile terminal UE. This payload CU is also linked to the gateway Gate which ensures the connectivity to modems managing the downlink feeder link frames gNB DL to the base stations gNB. In this case, the digital signals to be transmitted in the different beams formed by the antenna are transported via the eCPRI/ORAN protocol, for example according to the ORAN standard, from/to the base stations gNB or between the satellites SAT through the ISLs. The architecture of the payload CU corresponds to a "split 7-2/7-2x7-3" functional subdivision. The RU function is responsible for converting the gNB signals (generally digital data in I/Q form, conveyed in CPRI or eCPRI mode) into 5G radio interface signals with the mobile terminal UE. The data of the different beams are multiplexed on the feeder link and the payload CU does the multiplexing/demultiplexing for them to be transmitted/received in the corresponding beams on the user location UU between the satellite SAT and the mobile terminal UE.

The invention proposes producing the architecture described in FIG. 2 in which the RU function is placed in the satellite, therefore far from the gNB, while being capable of managing a significant and variable delay between the satellite and gNB, which is not the case with the current terrestrial 5G equipment.

Figure 3:
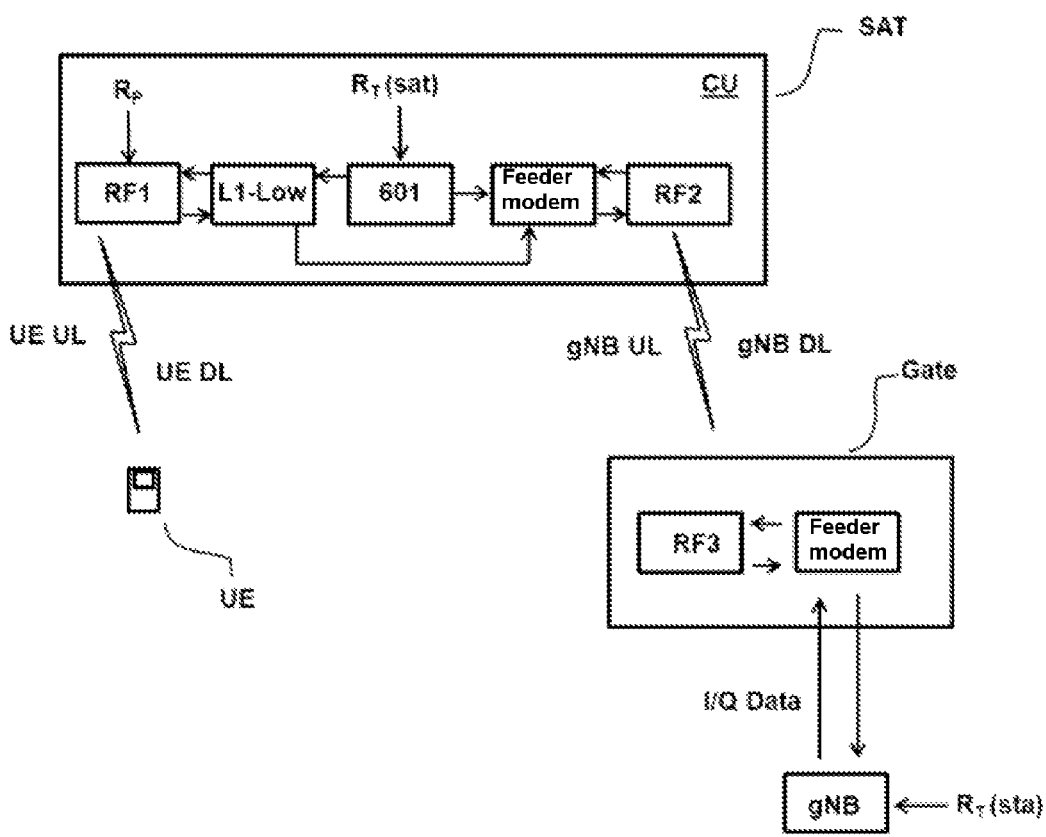
FIG. 3 illustrates a first embodiment of a compensation device in the communication system of FIG. 1.

FIG. 3 illustrates a first embodiment of a compensation device in the communication system of FIG. 1, in which a compensation is implemented at the satellite SAT. This compensation device comprises a buffer module 601 on the satellite SAT. The buffer module 601 is adapted to store the uplink feeder link frames gNB UL before their transmission via a radiofrequency module RF1 in order to absorb the variation of delay on the feeder link between the satellite SAT and the base station gNB.

It should be noted that the storage of frames, called bufferization, by the buffer module 601, is potentially pointless in the radiofrequency module RF2 to base station gNB direction. Indeed there is nothing to prevent the base station gNB from processing the downlink feeder link frames upon reception, provided the information on the frame/slot/symbol number corresponding to each frame is provided. Nevertheless, the bufferization principle can also be applied in this direction if the base station gNB concerned has an implementation constraint necessitating receiving the downlink feeder link frames with a fixed latency with respect to the time reference point $R_P$.

The implementation of FIG. 3 is applied to the case where the satellite SAT includes a part of the 5G functionalities, that is to say that a processing is applied at the physical layer level of the 5G frames before transmission to the mobile terminal UE or to the base station gNB. To this end, the satellite SAT includes an L1-Low module which corresponds to the bottom part of the physical layer in a functional subdivision of "split 7-2/7-2x/7-3" type.

The feeder link transports I/Q digital data between the base station gNB and the second radiofrequency module RF2 by using, for example, a link of DVB-S2x type, with DVB modems for the feeder link in the base station and in the satellite.

The radio unit present in the payload CU has an internal clock, denoted $R_T(\text{sat})$, linked to the satellite SAT. This reference clock $R_T(\text{sat})$ is, for example, based on GNSS (global navigation satellite system) to make it possible to transmit the frames stored in the buffer module 601 to the mobile terminal UE at the right moment.

Figure 4:
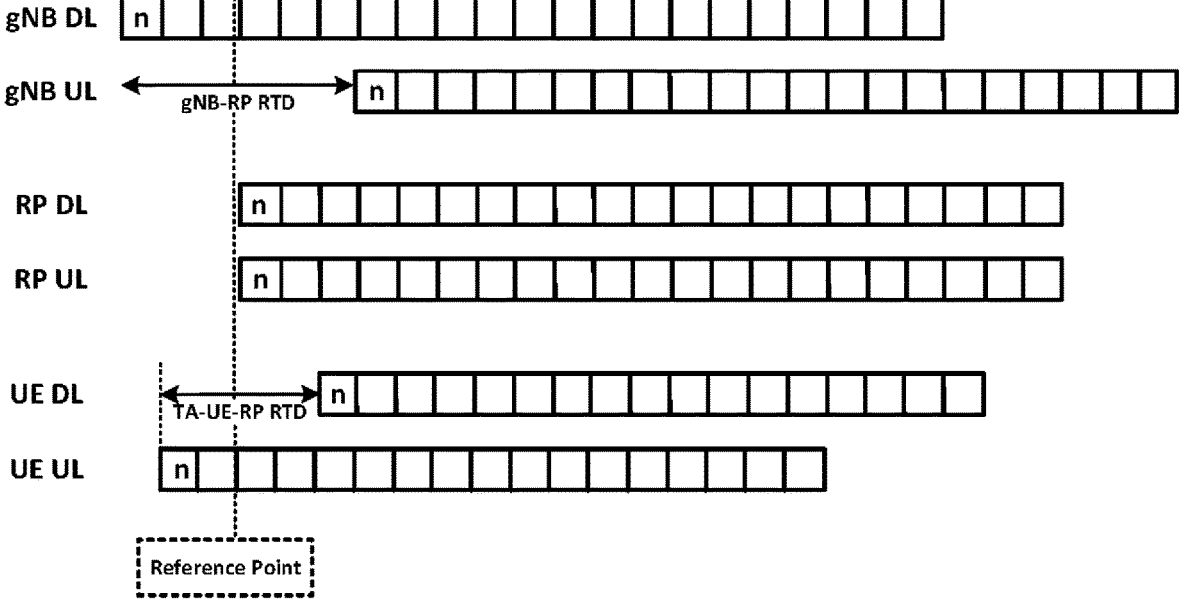
FIG. 4 illustrates a synchronization between the different points of the communication system with a time reference point shifted into the satellite.

FIG. 4 illustrates a synchronization between the different points of the communication system 1 in the embodiment of FIG. 3. A time synchronization is necessary between the satellite SAT and the base station gNB on the ground (for example based on GNSS) in order to keep the time references of these two elements synchronized, the base station gNB having uplink and downlink timings which exhibit a fixed offset with respect to the satellite, the gNB-RP round-trip delay (RTD) being fixed as seen by the base station gNB. Thus, the base station gNB must transmit the frames to the satellite SAT with an advance equal to half the gNB-RP RTD. It can possibly be considered as a fixed and parameterizable value in the system to cover its maximum value and, in this case, this value does not have to be measured by the system.

In the implementation of this embodiment, the maximum limit on the distance between the base station gNB and the time reference point $R_P$ is determined in practice by the memory capacity in the satellite SAT for the bufferization of the uplink feeder link frames gNB UL.

This implementation necessitates having the capacity to store in the satellite SAT the uplink feeder link frames gNB UL over periods which correspond to the maximum variation of the delay on the feeder link (several ms), and do so for all the beams managed by the satellite (potentially several hundred), which can be a strong constraint in terms of the quantity of memory necessary in the payload CU (for example several Mbytes for the satellite SAT managing several hundreds of beams).

It will be noted that, in this embodiment, it is not necessary to calculate the propagation time between the satellite SAT and the gateway Gate, because the time information (identifying the frame, slot, symbol number) conveyed with the eCPRI frames is sufficient to know the time at which the transmission of the corresponding downlink service radio frame must take place.

Figure 5:
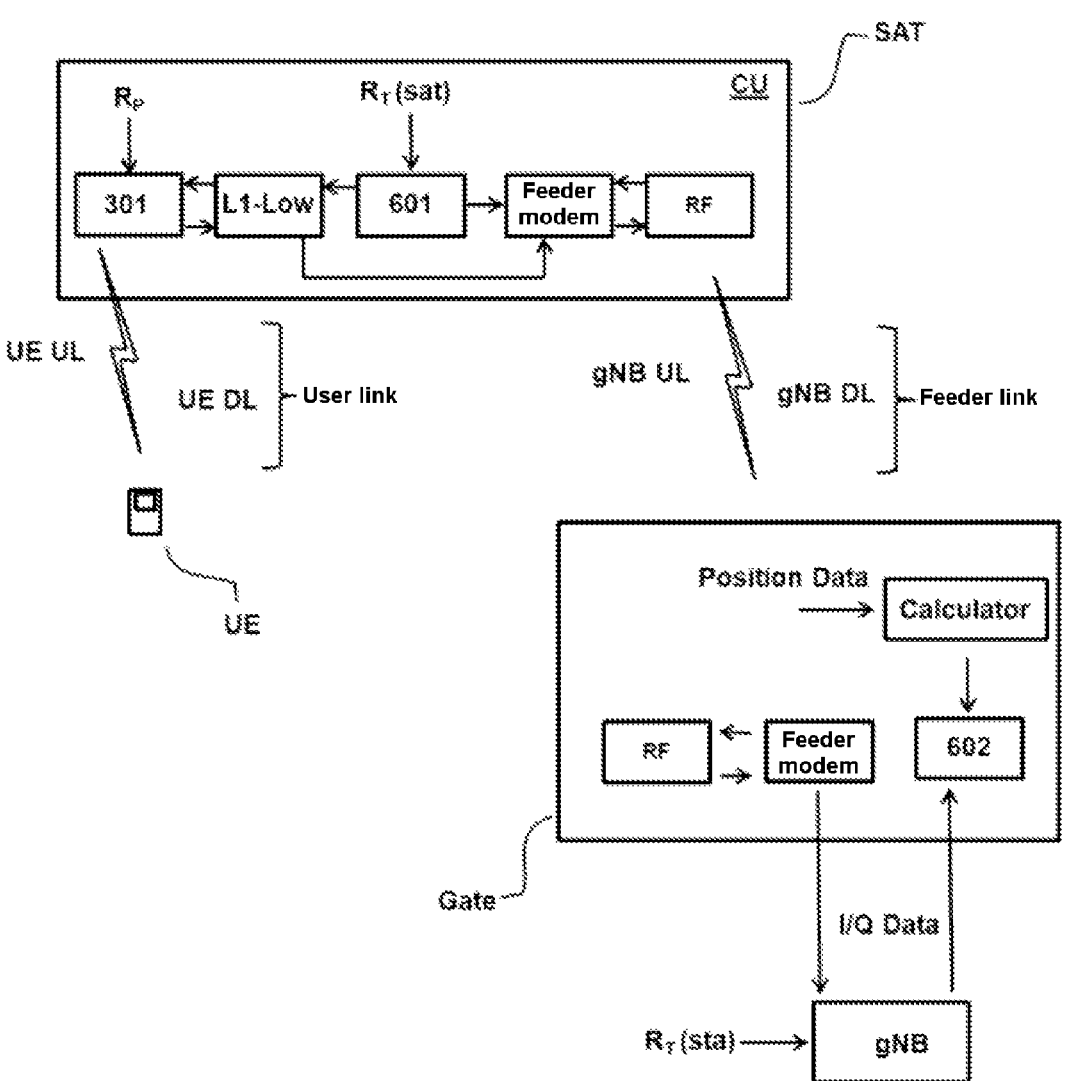
FIG. 5 illustrates a second embodiment of a compensation device in the communication system of FIG. 1.

FIG. 5 illustrates a second embodiment of a compensation device in the communication system of FIG. 1, in which pre-compensations are combined on the ground and on the satellite. Thus, in addition to the buffer module 601 present in the satellite SAT, FIG. 5 describes a pre-compensation module 602 in the gateway Gate. The buffer module 601 is able to temporally resynchronize the feeder link frames gNB UL, gNB DL with respect to the reference clock R_T(sat) of the satellite SAT. In order to save on the memory necessary in the satellite SAT to implement the bufferization, a more economical implementation consists in doing a first bufferization in the pre-compensation module 602 to compensate most of the delay on the feeder link, the satellite SAT then only being responsible for the fine synchronization of the service frames with the time reference point R_P. before transmission on the service link to the user.

By virtue of the information supplied by a satellite control centre (not represented) on the ephemerides and knowing the position of the base station gNB, the pre-compensation module 602 in the gateway (Gate) applies a pre-compensation of the feeder link delay. This pre-compensation is determined as follows. Through knowledge of the position of the satellite SAT and that of the gateway Gate, the propagation time between the satellite SAT and the gateway Gate can be calculated and compensated.

$$\Delta t_{SAT} = \frac{|\vec{d}|}{c}$$

$$\Delta t_{SAT} = \frac{\sqrt{(P_x^{SAT} - P_x^{GW})^2 + (P_y^{SAT} - P_y^{GW})^2 + (P_z^{SAT} - P_z^{GW})^2}}{c}$$

On each slot (1 ms), the compensation is updated.

Based on a FIFO regulated by the timing variations:

When the timing becomes greater, the FIFO empties progressively to compensate for the increase in the delay. When the timing decreases, the FIFO fills progressively to compensate for the reduced delay. All that allows $\Delta t_{SAT}$+ $\Delta t_{FIFO}$ to remain constant in order to mask the variations of $\Delta t_{SAT}$. The FIFO must of course be dimensioned such that $\Delta t_{FIFO\_MAX} = \Delta t_{SAT\_MAX} - t_{SAT\_MIN}$ It is also possible to compensate the delay to the centre of the beam, by taking into account the distance between satellites and the centre of the beam in the calculation of $\Delta t_{SAT}$ and combine the two compensations, but that necessitates a greater bufferization.

For each uplink feeder link frame gNB UL from the base station gNB, when the interface is of eCPRI type (for example ORAN), the information conveyed with the frame makes it possible to simply know the time at which the data that it contains must be transmitted over the downlink service link because this information contains an indication on the frame number, the slot number and the symbol number to which it corresponds. This information is supplied by the base station gNB to the satellite SAT for the downlink direction to the mobile terminal UE. This information is supplied by the mobile terminal UE to the base station gNB for the uplink direction, that is to say from the mobile terminal UE to the base station gNB, based on the time reference point R_P.

Figure 6:
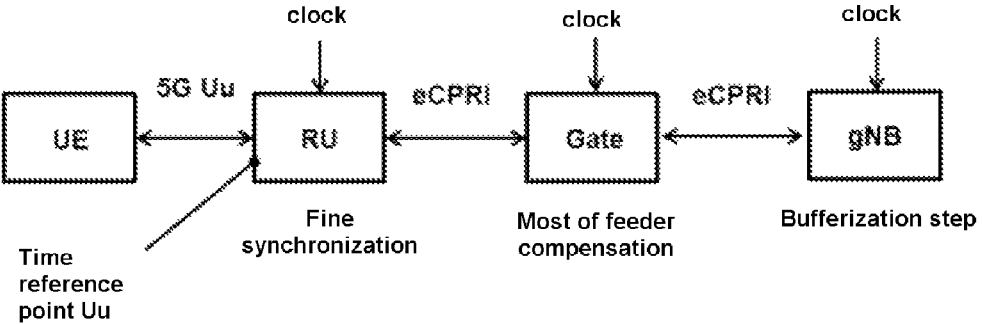
FIG. 6 illustrates a double timing-compensation stage in the second embodiment.

The pre-compensation done by the pre-compensation module 602 in the gateway Gate can be difficult to apply with a precision that is compatible with the 3GPP requirements for the signal over the service link. Indeed, the time error with respect to the reference time must remain well below the duration of the cyclic prefix of the 5G standard, that is to say less than approximately a microsecond to avoid inter-symbol interferences. As is illustrated in FIG. 6, a fine resynchronization on the time reference point R_P is applied at the satellite SAT before generation of the downlink service frames UE DL to the mobile terminal UE. The pre-compensation applied at the gateway Gate must be so as to guarantee that the frames arrive at the satellite SAT before the time of transmission at the time reference point R_P. Thus, this pre-compensation must include a margin to cover an uncertainty on the evaluation of the feeder delay (and of the processing time in the satellite). This margin can typically be reduced to a few tens of μs, even less, and the maximum bufferization time in the satellite can be bounded at this value of a few tens of μs, which requires a few tens of kbytes of memory at most for a few hundred beams.

Figure 7:
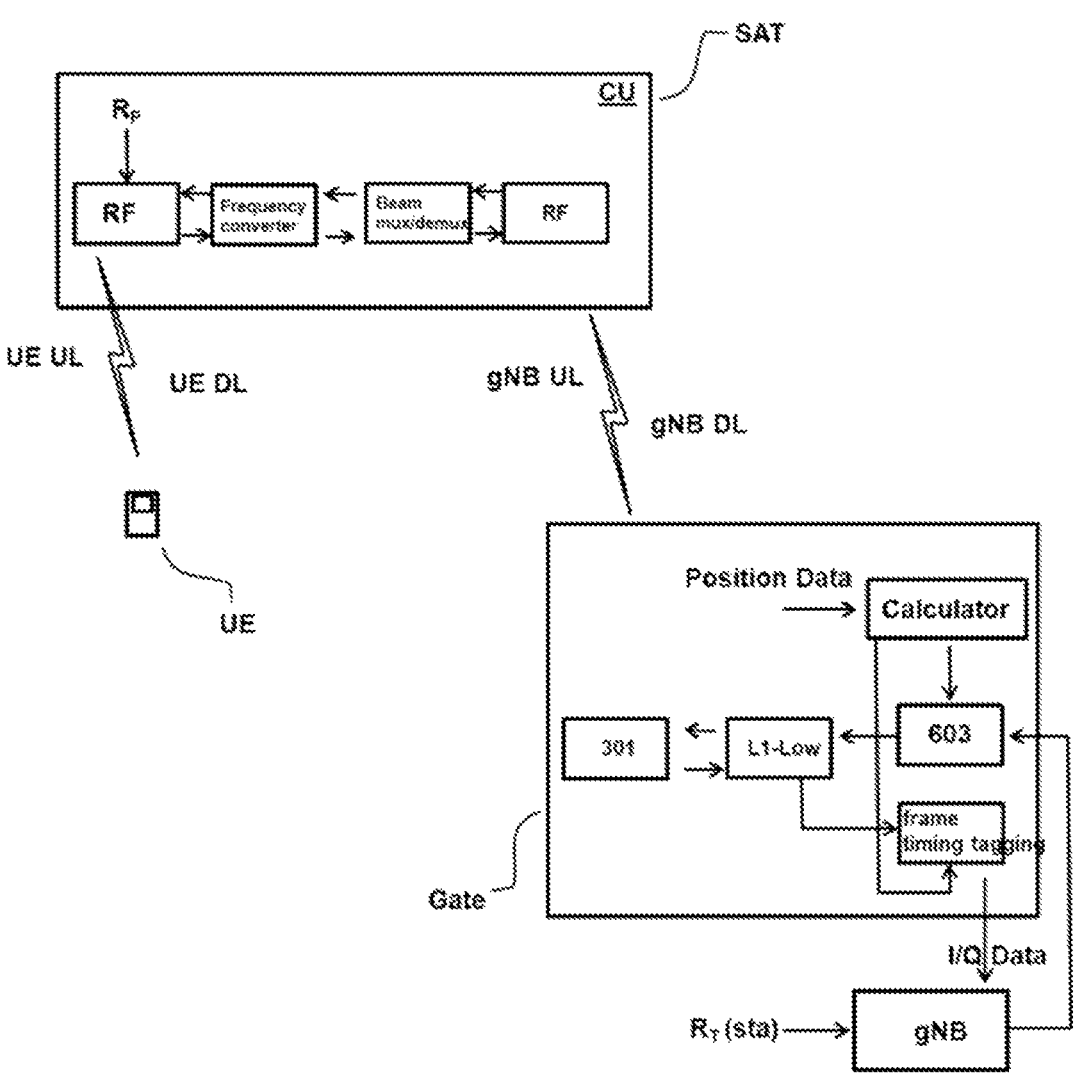
FIG. 7 illustrates a third embodiment of a compensation device in the communication system of FIG. 1.

FIG. 7 illustrates a third embodiment of a compensation device in the communication system of FIG. 1. In this embodiment, the pre-compensation is only on the ground, for example in the gateway Gate.

In the case of a satellite with a transparent payload, it is difficult to apply a compensation on this satellite because it directly relays the signal originating from the mobile terminal UE and is simply a repeater responsible for sending/receiving the signals on the various beams, with a frequency transposition between the frequency band used on the feeder link and that used on the user link with the mobile terminal UE, the processing time in the satellite being able to be considered as a fixed value. It is then possible to apply a pre-compensation on the ground.

Since no synchronization of the frames to the mobile terminal UE can be applied by the satellite, the synchronization is performed just before the radio unit which generates the 5G user signal, for example in the gateway Gate or in the base station gNB by applying a variable delay so that the frame reaches the satellite and can be retransmitted by the satellite over the user link with the mobile terminal at the reference time to which it corresponds, the processing time in the satellite being able to be considered fixed.

It should be noted that any error on the synchronization applied by the radio unit is reflected over the user link with the mobile terminal UE. The temporal precision must therefore be better than the duration of the Cyclic Prefix/2 (CP) of the interface, that is to say typically of the order of 1-2 microseconds at most for an OFDMA subchannel spacing (SCS, SubCarrier Spacing) of 15 kHz.

In the three embodiments, the invention relates to the timing compensation and bufferization mechanisms which make it possible to show the base station gNB on the ground a fixed delay on the feeder link, even though the real delay on the link is highly variable (NGSO satellite), which makes it possible to avoid the impacts in the gNB on the eCPRI layer and on the scheduler function, and to not have to implement in the gNB a measurement of the eCPRI delay or orbital calculations, and bufferization.

It is then possible to be able to implement these compensations and bufferizations in two steps, the compensation step on the ground being particularly important in this case.

Furthermore, it is possible to apply bufferization mechanisms to compensate the variation of the delay of the feeder link which conveys the RU-gNB interface and allows implementation of the 5G RU function in the satellite.

The manner in which these compensations can be done at a location distinct from the time reference point of the radio interface and therefore be able to place this reference point at any location, without being constrained by the location where the 5G RU function is implemented.

In a particular embodiment, the payload CU is partially regenerative.

Figure 8:
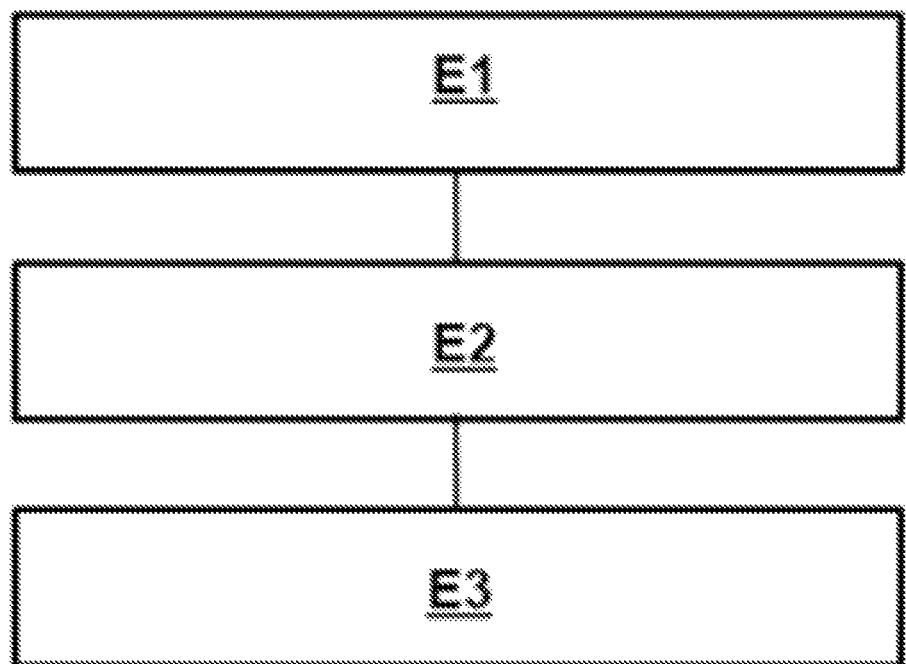
FIG. 8 illustrates the steps of a communication method according to the invention for a 5G communication between at least one mobile terminal and a core network.

FIG. 8 illustrates a communication method for a 5G communication between at least one mobile terminal UE and a core network CN. The communication method comprises:

in a step E1, exchanges of feeder link frames gNB UL, gNB DL, between said satellite SAT and a gateway Gate, said gateway Gate being disposed between said satellite SAT and a base station gNB linked to the core network CN;

in a step E2, exchanges of service frames UE UL, UE DL between said satellite SAT and the mobile terminal UE, said satellite SAT being at the interface between the feeder link frames gNB UL, gNB DL and the service frames UE UL, UE DL for the exchange of data between the mobile terminal UE and the core network CN, said service frames UE UL, UE DL comprising uplink service frames UE UL and downlink service frames UE DL, said uplink service frames UE UL having to be temporally aligned with said downlink service frames UE DL around a time reference point $R_P$, said service frames UE UL, UE DL being managed by a radio unit 301 belonging to a payload CU of the satellite SAT;

in a step E3, a compensation suitable for compensating time differences in the exchange of the feeder link frames gNB UL, gNB DL in order to temporally align the uplink service frames UE UL and the downlink service frames UE DL around the time reference point $R_P$.

Preferentially, the compensation step E3 comprises two substeps performed respectively in the payload CU of the satellite and in the gateway Gate.

As a variant, the compensation step E3 is performed only in the payload CU of the satellite SAT or this compensation step E3 is performed only in the gateway Gate.

The invention thus provides the following advantages:

It simplifies the implementation of a regenerative payload in the satellite, which makes it possible to conceal from the mobile the imperfections of the transmission over the feeder link which would be visible in transparent mode and which would impair the quality of the link with the terminal, for example the phase noise on the feeder link if the latter uses a high frequency band, like the Ka or QN band.

Another advantage of this architecture is being able to totally mask from the terminal UE the delay variation and the doppler on this feeder link, so that it does not have to compensate them.

Another advantage is reducing the RTD (Round-Trip Delay) between the terminal and the reference point, which makes it possible to limit the amplitude of the TA (Timing Advance) that the terminal must apply in the uplink direction on the user link.

Another advantage of the solution is that it can be extended to be capable of going as far as positioning the reference point as close as possible to the terminals which are in the cell (for example at the centre of the beam), bringing the RTD value between the terminal and the reference point back to values close to the deployments of terrestrial cellular networks (for example a few tens of km) and compatible with UE not implementing the satellite access functionalities of the 3GPP release 17.

Another advantage is being able to place the gNB at a great distance from the ground station (for example several hundreds of kilometres), which offers greater flexibility in the deployment of the ground segment.

Lastly, the solution offers the flexibility of being able to be implemented partially or totally in equipment on the ground so as to simplify the implementation in the payload of the satellite (for example to minimize the memory requirements in the payload).

The solution can also be applied to a transparent payload architecture (in which the satellite is considered as a repeater of the 5G user radio signal with the Radio Unit RU on the ground, for example incorporated in the gateway, in order to bring the reference point closer to the terminal (for example on the satellite or at the centre of the beam) with the advantages explained above.

The invention claimed is:

1. A communication system for a 5G communication between at least one mobile terminal (UE) and a core network comprising a plurality of base stations (gNB), said communication system comprising:

at least one satellite (SAT) comprising a payload (CU), at least one base station of the plurality of base stations (gNB) and a gateway (Gate) disposed between said satellite (SAT) and said base station (gNB), said satellite (SAT) and said gateway (Gate) being able to exchange feeder link frames (gNB UL, gNB DL), said mobile terminal (UE) and said satellite (SAT) being able to exchange service frames (UE UL, UE DL), said service frames (UE UL, UE DL) comprising uplink service frames (UE UL) and downlink service frames (UE DL), said uplink service frames (UE UL) having to be temporally aligned with said downlink service frames (UE DL) around a time reference point (RP);

a radio unit suitable for managing the exchanges of service frames (UE UL, UE DL) between the satellite (SAT) and the mobile terminal (UE); and a compensation device suitable for compensating the time differences in the exchange of the feeder link frames (gNB UL, gNB DL) in order to temporally align the uplink service frames (UE UL) and the downlink service frames (UE DL) around the time reference point (RP), wherein the compensation device comprises a buffer module disposed in the payload (CU) of the satellite (SAT), said buffer module being able to process the feeder link frames (gNB UL, gNB DL), wherein the compensation device comprises a pre-compensation module in the gateway, and wherein the buffer module is able to temporally resynchronize the feeder link frames (gNB UL, gNB DL) with respect to a reference clock ($R_T$(sat)) of the satellite (SAT), the pre-compensation module being able to process a first bufferization to compensate most of a delay on the feeder link, the satellite (SAT) then only being responsible for the fine synchronization of the service frames (UE UL, UE DL) with the time reference point (RP) before transmission on a service link to the user.

2. The communication system according to claim 1, wherein the payload (CU) of the satellite (SAT) is partially regenerative.

3. The communication system according to claim 1, wherein the payload (CU) of the satellite (SAT) comprises the radio unit.

4. The communication system according to claim 1, wherein the time reference point ($R_P$) is disposed in the satellite (SAT).

5. The communication system according to claim 1, wherein the radio unit comprises an RF module associated with a L1-low module.

6. A communication method for a 5G communication between at least one mobile terminal (UE) and a core network formed by at least one base station of a plurality of base stations via a satellite (SAT) comprising a payload (CU), said communication method comprising:

exchanges (E1) of feeder link frames (gNB UL, gNB DL), between said satellite (SAT) and a gateway (Gate), said gateway (Gate) being disposed between said satellite (SAT) and the base station (gNB) of the plurality of base stations;

exchanges (E2) of service frames (UE UL, UE DL) between said satellite (SAT) and the mobile terminal (UE), said service frames (UE UL, UE DL) comprising uplink service frames (UE UL) and downlink service frames (UE DL), said uplink service frames (UE UL) having to be temporally aligned with said downlink service frames (UE DL) around a time reference point (RP), said service frames (UE UL, UE DL) being managed by a radio unit;

a compensation step (E3) suitable for compensating time differences in the exchange of the feeder link frames (gNB UL, gNB DL) in order to temporally align the uplink service frames (UE UL) and the downlink service frames (UE DL) around the time reference point ($R_P$) and in that the compensation step (E3) comprises two substeps performed respectively in the payload of the satellite (CU) and in the gateway (Gate), said compensation step (E3) being implemented by a compensation device comprising a buffer module disposed in the payload (CU) of the satellite (SAT), said buffer module being able to process the feeder link frames (gNB UL, gNB DL), the compensation device comprising a pre-compensation module in the gateway and in which the buffer module is able to temporally resynchronize the feeder link frames (gNB UL, gNB DL) with respect to a reference clock ($R_T$(sat)) of the satellite (SAT), the pre-compensation module being able to process a first bufferization to compensate most of a delay on the feeder link, the satellite (SAT) then only being responsible for the fine synchronization of the service frames (UE UL, UE DL) with the time reference point ($R_P$) before transmission on a service link to the user.

* * * * *